(12) United States Patent
Tuukkanen

(10) Patent No.: US 9,046,376 B2
(45) Date of Patent: Jun. 2, 2015

(54) METHOD AND APPARATUS FOR GENERATING ROUTE EXCEPTIONS

(71) Applicant: NAVTEQ B.V., Veldhoven (NL)

(72) Inventor: Marko Tuukkanen, Berlin (DE)

(73) Assignee: HERE GLOBAL B.V., Veldhoven (NL)

( * ) Notice: Subject to any disclaimer, the term of this patent is extended or adjusted under 35 U.S.C. 154(b) by 0 days.

(21) Appl. No.: 14/201,378

(22) Filed: Mar. 7, 2014

(65) Prior Publication Data

US 2014/0188390 A1     Jul. 3, 2014

Related U.S. Application Data

(63) Continuation of application No. 13/075,439, filed on Mar. 30, 2011, now Pat. No. 8,706,407.

(51) Int. Cl.
*G01C 21/34* (2006.01)
*G01C 21/36* (2006.01)

(52) U.S. Cl.
CPC ............ *G01C 21/34* (2013.01); *G01C 21/3492* (2013.01); *G01C 21/3691* (2013.01)

(58) Field of Classification Search
USPC ................. 701/423, 426, 117–119, 414, 533; 340/995.12, 995.21, 933, 995.1
See application file for complete search history.

(56) References Cited

U.S. PATENT DOCUMENTS

2008/0255754 A1*  10/2008  Pinto ............................. 701/119
2011/0137551 A1*   6/2011  Peri .............................. 701/201
2011/0288756 A1*  11/2011  Chapman et al. ............. 701/118

FOREIGN PATENT DOCUMENTS

EP          2270432      *  1/2011  ............. G01C 21/34

* cited by examiner

*Primary Examiner* — Marthe Marc-Coleman
(74) *Attorney, Agent, or Firm* — Ditthavong & Steiner, P.C.

(57) ABSTRACT

An approach for providing mapping information and route information based on exception information received from various users travelling within a common area is described. A navigation system processes travel information associated with one or more devices for comparison against predetermined route information. The navigation system also determines one or more exceptions based, at least in part, on the comparison. The predetermined route information, mapping information, or a combination thereof it then caused to be updated based, at least in part, on the processing of the one or more exceptions.

20 Claims, 14 Drawing Sheets

100

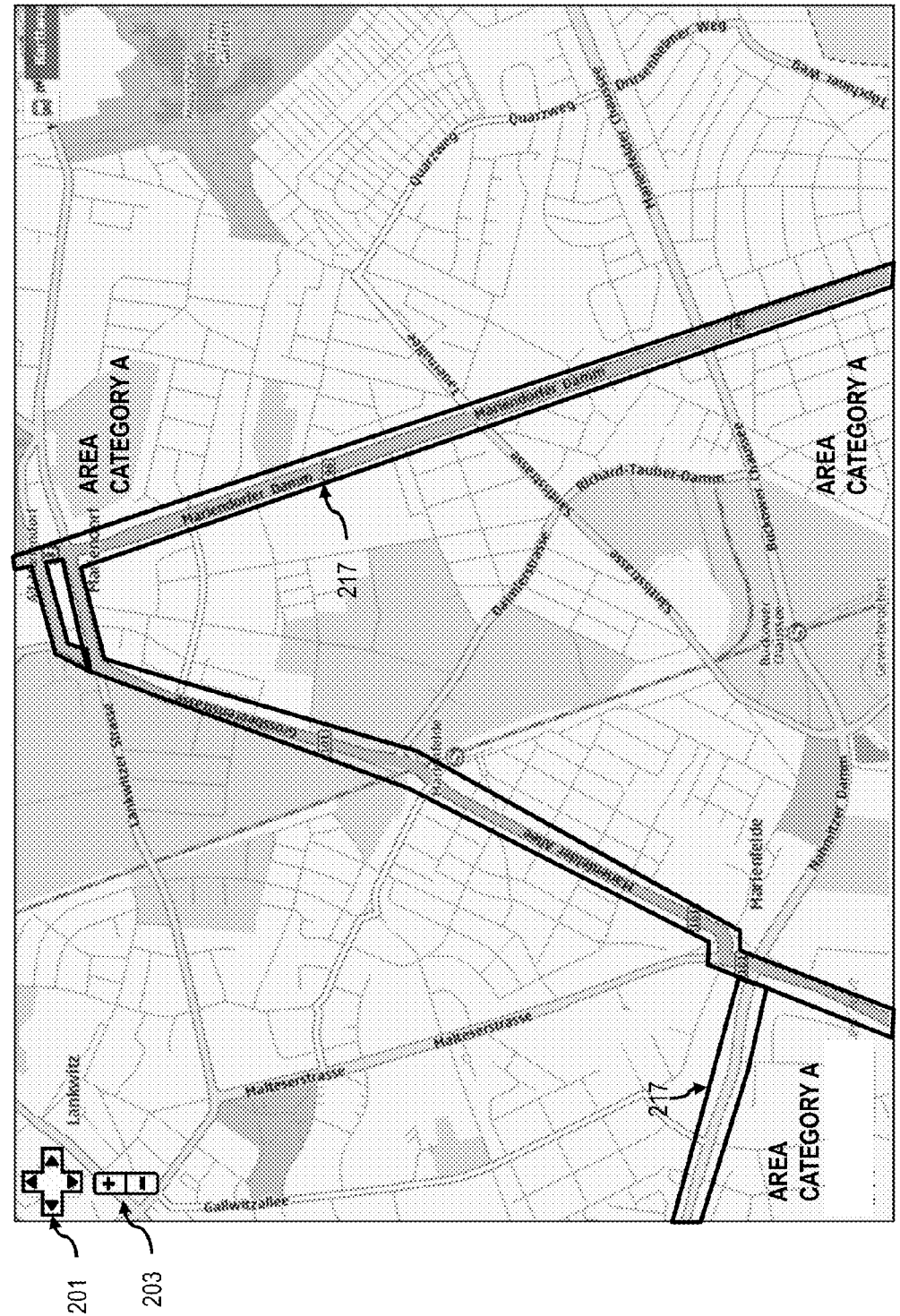

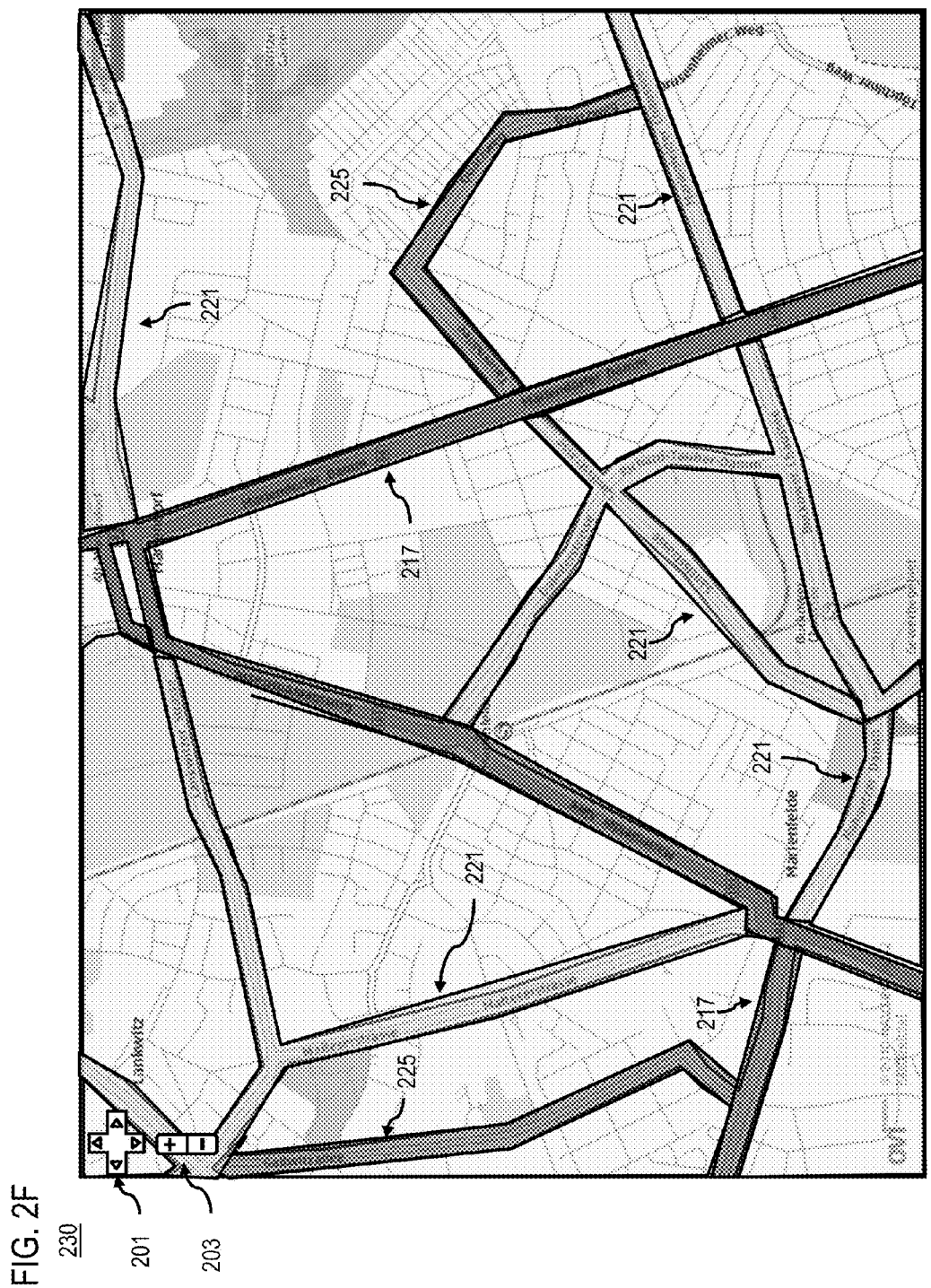

408

400

420

414

434

426

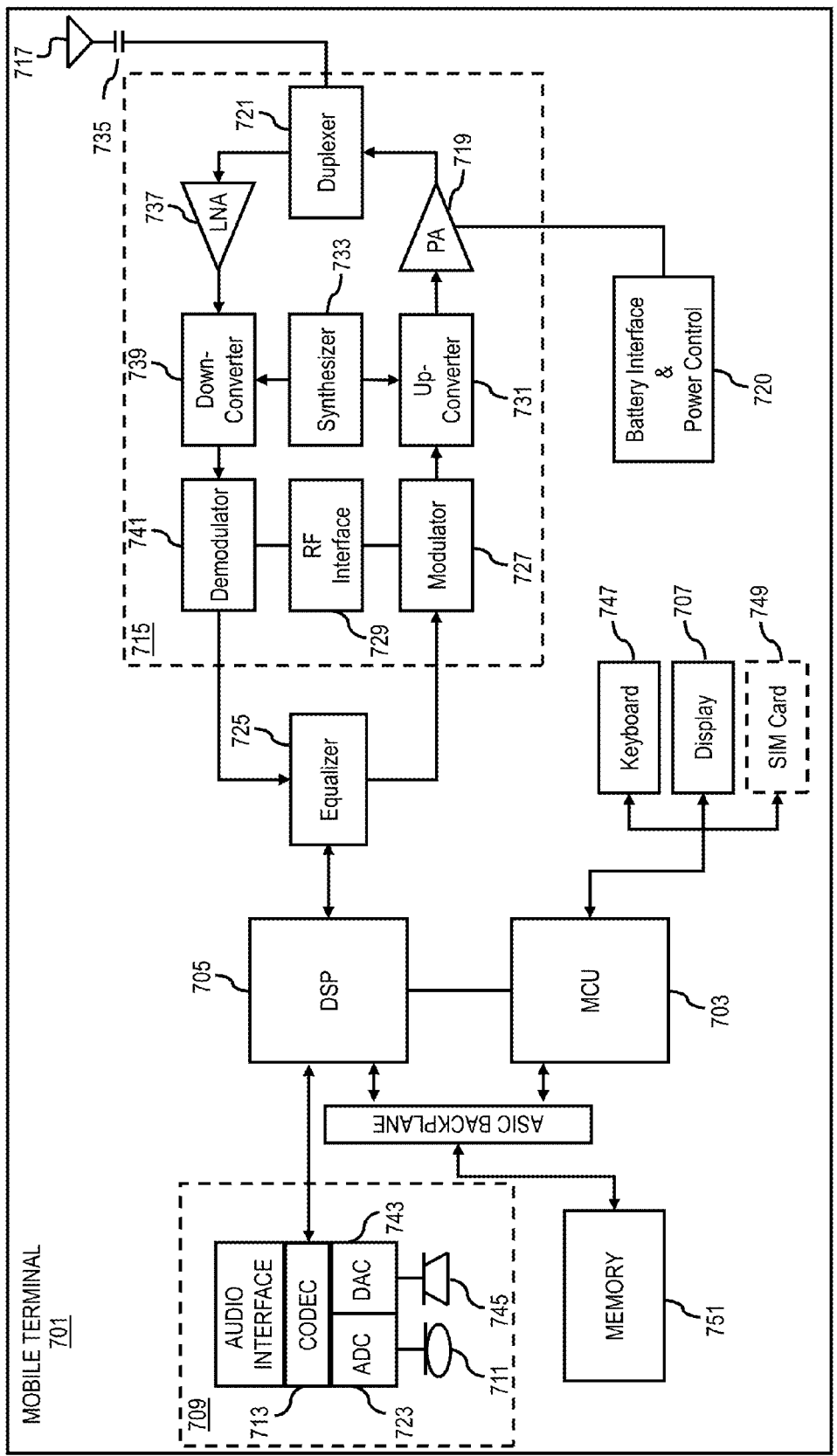

METHOD AND APPARATUS FOR GENERATING ROUTE EXCEPTIONS

CROSS-REFERENCE TO RELATED APPLICATIONS

This application is a continuation of U.S. application Ser. No. 13/075,439, filed Mar. 30, 2011, the entirety of which is incorporated herein.

BACKGROUND

Service providers and device manufacturers (e.g., wireless, cellular, etc.) are continually challenged to deliver value and convenience to consumers by, for example, providing compelling network services. One area of interest has been in providing users with navigation and mapping services by way of a mobile device. For example, many devices are equipped with global positioning sensors, navigation and mapping applications for enabling users to be presented navigation data such as maps, travel directions, route details and the like. To ensure the navigation or mapping application remains up-to-date, updated navigation data must be periodically downloaded from a navigation or communication service provider associated with the mobile device. Unfortunately, the navigation data is static, resulting in the generation of maps, travel directions and other details that do not account for real-time conditions that affect a traveler's ability to reach a destination (e.g., adverse road conditions, accidents, congestion) by way of a predetermined route.

SOME EXAMPLE EMBODIMENTS

Therefore, there is a need for an approach for providing navigation information based on route exception information received from various users travelling within a common area.

According to one embodiment, a method comprises processing and/or facilitating a processing of travel information associated with one or more devices for comparison against predetermined route information. The method also comprises determining one or more exceptions based, at least in part, on the comparison, wherein the one or more exceptions represents at least one deviation by at least one of the one or more devices from at least one route indicated in the predetermined route information. The method further comprises processing and/or facilitating a processing of the one or more exceptions to cause, at least in part, updating of the predetermined route information, mapping information, or a combination thereof.

According to another embodiment, an apparatus comprises at least one processor, and at least one memory including computer program code, the at least one memory and the computer program code configured to, with the at least one processor, cause, at least in part, the apparatus to process and/or facilitate a processing of travel information associated with one or more devices for comparison against predetermined route information. The apparatus is also caused to determine one or more exceptions based, at least in part, on the comparison, wherein the one or more exceptions represents at least one deviation by at least one of the one or more devices from at least one route indicated in the predetermined route information. The apparatus is further caused to process and/or facilitate a processing of the one or more exceptions to cause, at least in part, updating of the predetermined route information, mapping information, or a combination thereof.

According to another embodiment, a computer-readable storage medium carries one or more sequences of one or more instructions which, when executed by one or more processors, cause, at least in part, an apparatus to process and/or facilitate a processing of travel information associated with one or more devices for comparison against predetermined route information. The apparatus is also caused to determine one or more exceptions based, at least in part, on the comparison, wherein the one or more exceptions represents at least one deviation by at least one of the one or more devices from at least one route indicated in the predetermined route information. The apparatus is further caused to process and/or facilitate a processing of the one or more exceptions to cause, at least in part, updating of the predetermined route information, mapping information, or a combination thereof.

According to another embodiment, an apparatus comprises means for processing and/or facilitating a processing of travel information associated with one or more devices for comparison against predetermined route information. The apparatus also comprises means for determining one or more exceptions based, at least in part, on the comparison, wherein the one or more exceptions represents at least one deviation by at least one of the one or more devices from at least one route indicated in the predetermined route information. The apparatus further comprises means for processing and/or facilitating a processing of the one or more exceptions to cause, at least in part, updating of the predetermined route information, mapping information, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 2A-2F are diagrams of mapping information and route information presentable to a user interface of a user device based on exception information 111 received from various user devices travelling within a common area, according to various embodiments;

FIG. 7 is a diagram of a mobile terminal (e.g., handset) that can be used to implement an embodiment of the invention.

DESCRIPTION OF SOME EMBODIMENTS

Examples of a method, apparatus, and computer program for providing navigation information based on route exception information received from various users travelling within a common area are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the various exemplary embodiments are described with respect to applications and services for supporting user navigation and mapping, it is contemplated that these embodiments have applicability to any data protocols, methodologies or systems for supporting global positioning system (GPS) technology, internet or network based mapping applications, trip planning applications, route planning services, location information services or the like.

Figure 1:
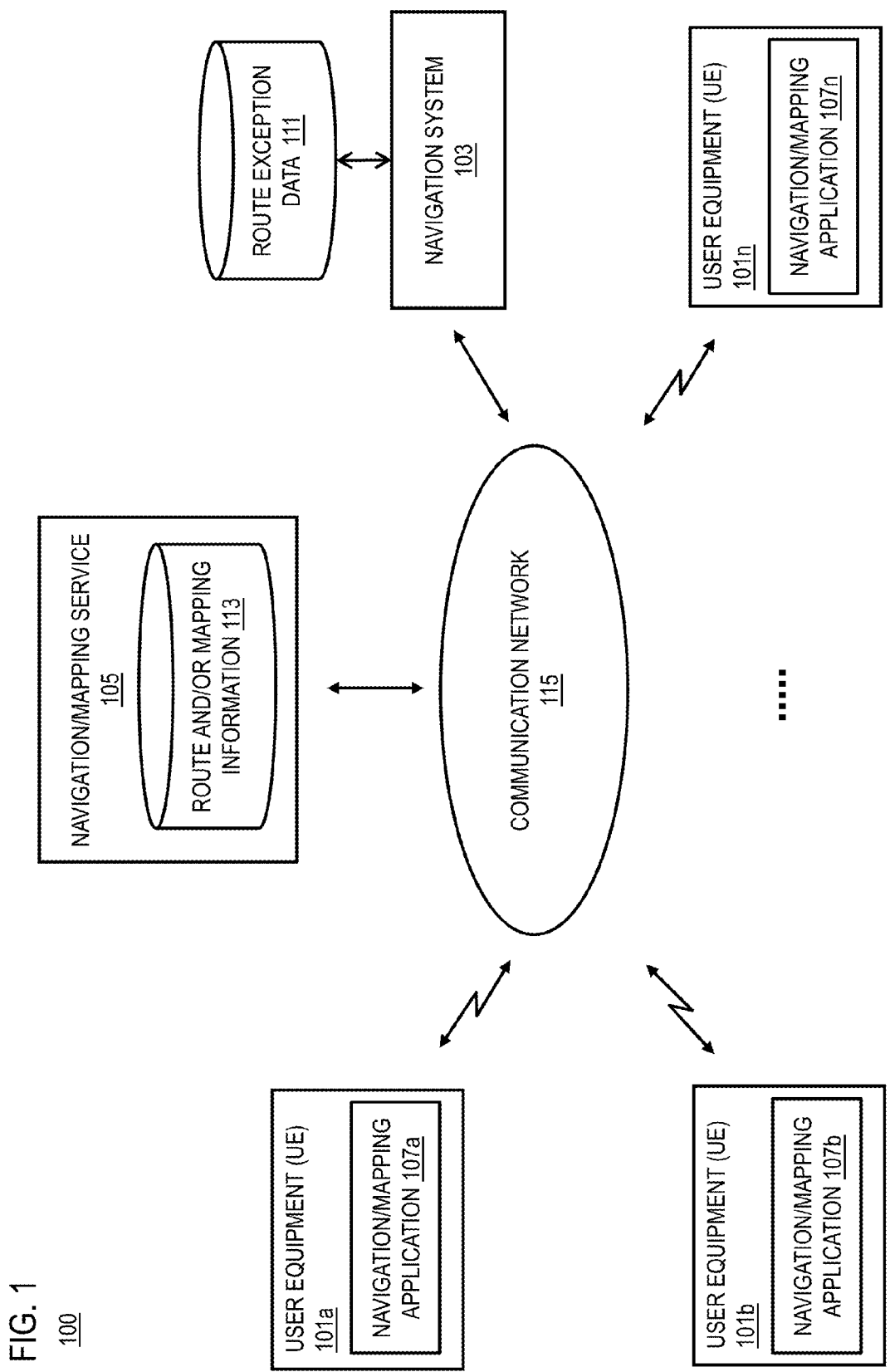
FIG. 1 is a diagram of a system capable of providing mapping information and route information based on exception information received from various users travelling within a common area, according to one embodiment.

FIG. 1 is a diagram of a system capable of providing mapping information and route information based on exception information received from various users travelling within a common area, according to one embodiment. By way of example, the system enables route information and/or mapping information to be updated/modified, then subsequently presented to a display of a user device (e.g., UE 101a-101n) operating a navigation/mapping application. The route information and/or mapping information are updated responsive to the occurrence of exceptions, or deviations to predetermined route information, as performed by one or more other users as they travel to the same destination or a common area as the user of the user device.

As used herein, a "navigation/mapping application" 107 includes any executable software or service by a user device for supporting user travel, including navigation services, mapping services, GPS based services and applications, railway mapping services, trip planning applications or the like. By way of example, navigation/mapping applications are enables for operation by a navigation/mapping service, presented over a communication network 115 by a service provider, which provides route information and/or mapping information 113 suitable for processing by the navigation/mapping application 107. "Route information" and "mapping information" 113 as used herein, pertains to any data capable of being processed by or presented by the navigation/mapping application 107 operable at a user device for the purpose of supporting travel, route planning, sightseeing, location finding, etc. By way of example, route information includes instructions and data for enabling users to arrive at a destination from a given starting point, including way points, destination points, travel details, directional details, street names, highway names, landmark data and other data. Route information may be provided to the user in textual, visual and audible form by the navigation/mapping application, and may be used singularly or in combination to enable a user to navigate from one location to a destination. In certain embodiments, the route information may be processed to identify one or more road segments, one or more path segments, or a combination thereof as required for facilitating navigation via a navigation/mapping application or service.

Mapping information pertains to data capable of process by an application or service for generating or presenting a map of an area (e.g., city, town, street or combination thereof). The mapping information may also be used in connection with route information, wherein the route information is visually depicted in association with a map. By way of example, mapping information may include various icons, graphics, indicators and descriptors for representing one or more throughways, buildings, landmarks, waterways, parks, vehicles, people, etc. In certain embodiments, the mapping information may visually depict one or more road segments, one or more path segments, or a combination thereof.

Of note, the route information and mapping information 113 may be presented to a user via a display of a user device running a navigation/mapping application 107 in combination or singularly. Furthermore, the information may be presented to a user by way of visual, textual, audible means or a combination thereof. In certain embodiments, the route information and/or mapping information 113 may be presented with respect to or inclusive of weather data, construction data, event data, traffic data (e.g., volume, capacity), speed data, temporal information and other data for supporting navigation.

Today's wireless communication devices, such as cell phones, smartphones, laptops and tablet computers are equipped with various applications and features for providing ease and convenience to users. Given the prevalent use of such devices as viable alternatives to desktop computers, which are stationary, they are configured for on-the-go use. Hence, applications and services for supporting navigation and mapping are commonly featured for use by most mobile ready devices, including those that support GPS data tracking and location services. By way of the application or service, users can be presented with maps, travel directions, route details and other forms of navigation information for supporting their travel, sightseeing or location finding needs. To ensure accuracy, updated mapping and/or route information must be periodically downloaded from a navigation or mapping service provider (e.g., navigation/mapping service 105) to account for changes in topography, town or city design, throughway configuration or additions, landmarks and other details that affect the ability of a user to reach a given destination.

Unfortunately, the mapping and/or route information as downloaded from the service is static, and does not account for real-time conditions that affect the reliability of maps, directions, routes and other information presented to a user. For example, while the most up-to-date map reflective of a given area may be downloaded to the user device accordingly, this map does not address traffic jams, construction, inclement weather, etc. Hence, the map generated for display to the user and corresponding travel directions presented are based on best case scenarios—i.e., the fastest route for reaching a destination. This approach, however, assumes there are no impediments to travel. While there are services for providing data related to such occurrences—i.e., for integration and use with navigation and/or mapping applications—this data is still based on general data, automatic traffic recording devices, forecast techniques, weigh-in-motion devices, etc. Despite the usefulness of such means of data gathering, there is currently no means of facilitating the updating and presentment of mapping and/or route information (e.g., route recommendations, travel directions, path segments, road segments) based on continuous reporting of the behavioral patterns of other users as they encounter conditions or obstacles that impact travel to a given destination.

To address this problem, a system 100 of FIG. 1 introduces the capability to adapt mapping information and/or route information based on the reporting of a predetermined number of exceptions, or deviations, to a preferred route to the destination. The exception as reported by differing UE 101a-101n is maintained as exception information 111. In addition, the system 100 facilitates presentment of updated mapping information and/or route information to the display of a user device, e.g., via a navigation/mapping service 105, based on this reporting. In certain embodiments, these capabilities are performed by a navigation system 103, which is configured to operate in connection with the navigation/mapping service 105 for supporting execution of navigation/mapping applications 107a-107n of one or more user devices, i.e., user equipment (UE) 101a-101n. The navigation system 103 may be configured to operate through automated means, administrator directed means, or a combination thereof.

"Exceptions" as used herein pertains to any mapping information or routing information for indicating an alternative to a predetermined route, including alternative path or road segments, mode of travel (e.g., speed, means), direction of travel, or the like. Exceptions are provided to the navigation system 103 by multiple users of devices, i.e., user equipment (UE) 101a-101n, that are traveling to the same destination or in a common area comprising a network of path segments or road segments (e.g., streets, highways, alleyways, etc., within a defined proximity or radius). By way of example, the navigation/mapping applications 107a-107n of UE 101a-101n transmits exception information 111 to the navigation system 103 over the communication network 115, such as in the form of type or reason information. By way of example, reason information may be data indicative of a particular obstacle, hindrance or circumstance that caused one or more user's to deviate from predetermined route information. This may include accidents, weather related obstacles, event based obstacles (e.g., concerts, protests), emergency response activity, construction based obstacles, etc.

Type information may be exception related data that is indicative of a particular type of exception or condition thereof. For example, one type of exception can be temporary while another is permanent. As another example, the type information may indicate the type of transport performed by a user and/or user device 101 that relayed the exception, such as car, commercial traffic, walking pedestrian, etc. It is further noted, that in certain embodiments, exception information 111 may also include data for suggesting an improvement to the preferred route.

As mentioned, the navigation/mapping service 105 maintains route and/or mapping information 113, which is subsequently processed by respective navigation/mapping applications at UE 101. By way of this approach, the navigation/mapping application may present mapping information and route information accordingly to a user via the display or speaker system of UE 101. A "route" or "route information," as presented herein, pertains to a set of instructions to be performed by a user respective to a given travel area for reaching a destination. The instruction may include travel in various directions along one or more streets, highways, etc., or a combination thereof; the various thoroughfares capable of being presented as mapping information in the form or one or more road segments, path segments or a combination thereof. By way of example, a user located currently at a location A wishing to travel to a destination E may arrive at the destination by way of routing information (routes) B, C or D. The route presented as a primary option to the user for arriving at the destination, referred to herein as a "predetermined route," may be based on numerous factors including current mapping and/or routing information, distance to the destination from location A, temporal data (e.g., shortest time from location A to D), user travel preferences (e.g., street travel preference rather than highway).

Typically, the predetermined route is that which requires the shortest travel distance or amount of time from location A to destination E. However, the navigation system 103 performs a comparison between the predetermined route as suggested by the navigation/mapping application 107 and detected travel information for one or more other UE 101a-101n travelling towards the same destination, along the same path or road segments, or in the same area. For example, the navigation system 103 may determine that one or more other users of UE 101 that have travelled to destination E by way of route C. As route C comprises one or more road segments or path segments, an area weighting value may be determined based on a categorization of the one or more segments.

The area weighting value indicates a level of severity, rank or preference of a given area relative to the predetermined route; the area consisting of one or more road segments, path segments or a combination thereof. Hence, area weighting information is generated by the navigation system 103 based on a categorization of the one or more road or path segments. It is noted that the categorization may account for traffic volume, traffic capacity, nearby points of interest, road or path segment usage type, and other factors. In the example presented above, an area weighting value may be higher to represent a thoroughfare that typically experiences significant traffic volume (e.g., a main or arterial roadway) along a particular route, while a lower value may be assigned to a thoroughfare that typically exhibits lower traffic volumes (e.g., a residential street). It is noted, therefore, that the weighting may be assigned based on historical characteristics of a given path, road, etc., based on data from observational models, computational methods, traffic detection techniques, etc. Also of note, area weighting may be determined/modified responsive to detection by the navigation system 103 of a number of exception occurrences.

In certain embodiments, when a number of exceptions are reported and recorded by the navigation system 103 up to a predetermined threshold, an update to the predetermined route information is generated. As mentioned previously, the exception information 111 may include type or reason information, such as data indicative of a particular obstacle or data for indicating the type of transport performed with respect to a user and/or user device 101 that relayed the exception (e.g., car, commercial traffic, walking pedestrian). By processing type information and/or reason information as reported, the navigation system 103 further generates exception weighting information. The exception weighting information indicates a level of severity, rank or preference of a given exception relative to the predetermined route. Hence, while various users of UE 101a-101n may execute differing alternate/deviant routes in lieu of given predetermined route information, the exception information 111 with a higher weighting is more suitable for affecting updating of the predetermined route information.

In certain embodiments, the exception weighting information may be based on the quantity of exceptions of like type and reason, the affinity between reason and type information, or a combination thereof. In addition, the navigation system 103 may also process user weighting information, such as for indicating a level of trust of a user and/or UE 101a-101n that reports an exception. By way of example, a user of UE 101 that is a truck driver or bus driver having high familiarity with a given roadway or street may garner higher trust, and hence a higher user weighting than a driver of a standard automobile. To facilitate reporting and user exception weighting, the navigation system 103 may also be configured to authenticate and/or identify users of UE 101a-101n that interact with the navigation/mapping service 105.

Updating of the predetermined route information can be facilitated by the navigation system 103 by submitting a notification signal to the navigation/mapping service 105. The signal may prompt generation and subsequent transmission of updated predetermined route information to the one or more navigation/mapping applications 107a-107n of UE 101a-101n. In other embodiments, the navigation system 103 may be configured to cause the update directly, such as by overriding the predetermined route information pursuant to the update, restricting presentment of the predetermine route, etc. Per this execution, alternative routing and/or mapping information (updated predetermined route information) is presented to a display of a user device. By way of example, when travel information for user devices 101b-101n indicates a sufficient number of exceptions to the predetermined route A (e.g., many users are taking route C); mapping and/or routing information for route C is presented accordingly. As such, path segments and road segments for execution of route C is displayed to reflect a deviation, and suitable alternative, to predetermined route A.

As described above, the navigation system 103 processes various data for generating and/or facilitating an update to the predetermined route, including: exception weighting information based in part on type and reason information, user weighting information based in part on trust information for a user, area weighting information based in part on a characterization/categorization (e.g., traffic intensity, points of interest) of one or more road or path segments, area weighting information. Consequently, the navigation system 103 enables real-time road and travel conditions, behavioural pattern data of multiple users (drivers), i.e., in the form of exceptions and historical information regarding various throughways to be factored into the mapping and route information generation process.

While shown as a separate entity, it is contemplated in certain embodiments that the navigation system 103 may be integrated with the navigation/mapping service 105; the operation of which is suitable for supporting execution of navigation/mapping applications 107 at one or more user devices. It is noted that integration and/or communication between the navigation/mapping service 105, navigation system 103 and one or more navigation/mapping applications 107a-107n of respective UE 101a-101n is facilitated by way of a communication network 115. The communication network 115 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof.

In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, navigation/mapping service 105 and navigation system 103 communicate with each other and other components of the communication network 115 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIGS. 2A-2F are diagrams of mapping information and route information presentable to a user interface of a user device based on exception information 111 received from various user devices travelling within a common area, according to various embodiments. For the purpose of illustration, the diagrams are described with respect to an exemplary use case of one or more users (e.g., travelers) configured to the navigation system 103 as they encounter various circumstances or conditions that affect their ability to reach a set destination. The users control UE 101a-101n, each of which operates respective navigation/mapping applications 107a-107n. It is noted that while the user interface depictions correspond to the process of updating predetermined route information, the devices may be configured to cause presentment of various additional screens based on exception reporting by UE 101a-101n to the navigation system 103.

Figure 2A:
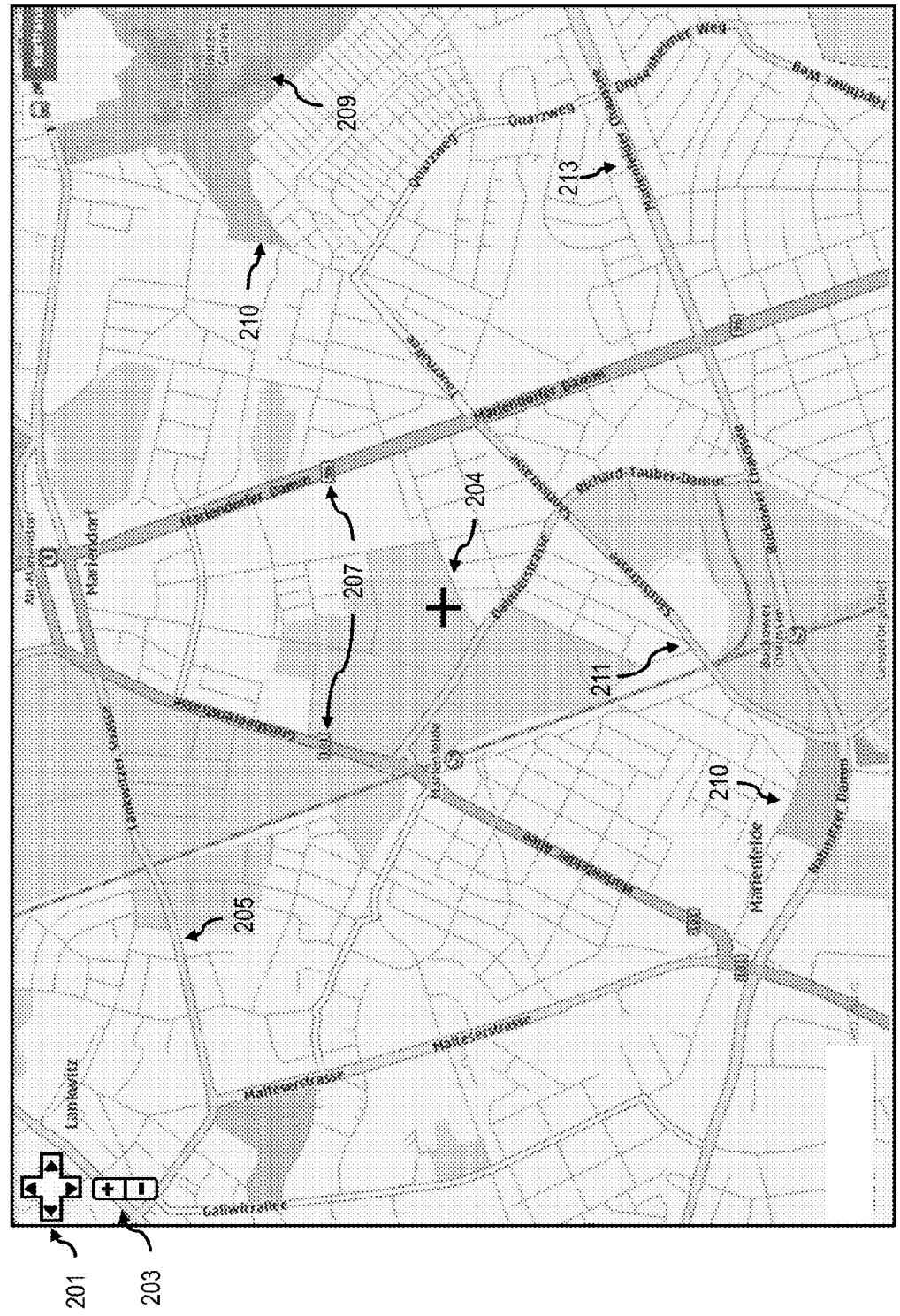

FIG. 2A is a display 200 for presenting mapping information for a given geographic area. The level of detail of the mapping information (map) is controlled by a zoom action button 203. In certain embodiments, the user may user may select the "−" feature of the zoom action button 203 for decreasing the amount of zoom, and hence reducing the level of magnification. By way of this approach, the scope of the mapping information is increased to a level of perspective ranging from street level to a state level view. Alternatively, the user may select the "+" feature of the zoom action button 203 for increasing the amount of zoom and hence, increasing the amount of perspective and magnification of detail of the mapping information. By way of this approach, the user may narrow the level of perspective from a state level view to a street level view. A pan action button 201 may also be featured for enabling the user to modify the location of a center point 204 of the map and therefore provide a directional perspective shift (e.g., "up" feature of the pan action button moves the center point 204 northward). While UE 101a-101n operating system requirements and display configuration may vary, execution of a particular action button may result in a continuous display refresh action.

The mapping information may include various descriptors, graphic elements, textual elements, indicators and other data for representing a map. Details may include and names of and graphics representative of throughways such as streets 205, 211 and 213 and roadways and highways 207. In addition, topological features such as a water source 209 and parks 210 may also be featured. The mapping information may also include various icons for representing one or more railways, buildings, landmarks and other details for increasing the usefulness of the map.

FIG. 2B is a display 215 for presenting mapping information along with a specific categorization of route information, labelled in this example as Area Category A. By way of example, this categorization of route information represents the most important road and/or path segments 217 for the geographic area depicted with respect to FIG. 2A. Under this scenario, the area weighting is based on traffic volume, wherein road and/or path segments 217 represent those with the most traffic. Consequently, road and/or path segments 217 have the highest area weighting. It is noted therefore that the navigation system 103 accounts for this area weighting and categorization whenever a user of a UE 101a-101n attempts to navigate to a destination within the geographic area as shown. Also of note, the road and/or path segments are presented as an overlay atop the mapping information for enabling the user to visualize specific route information more clearly.

Figure 2C:
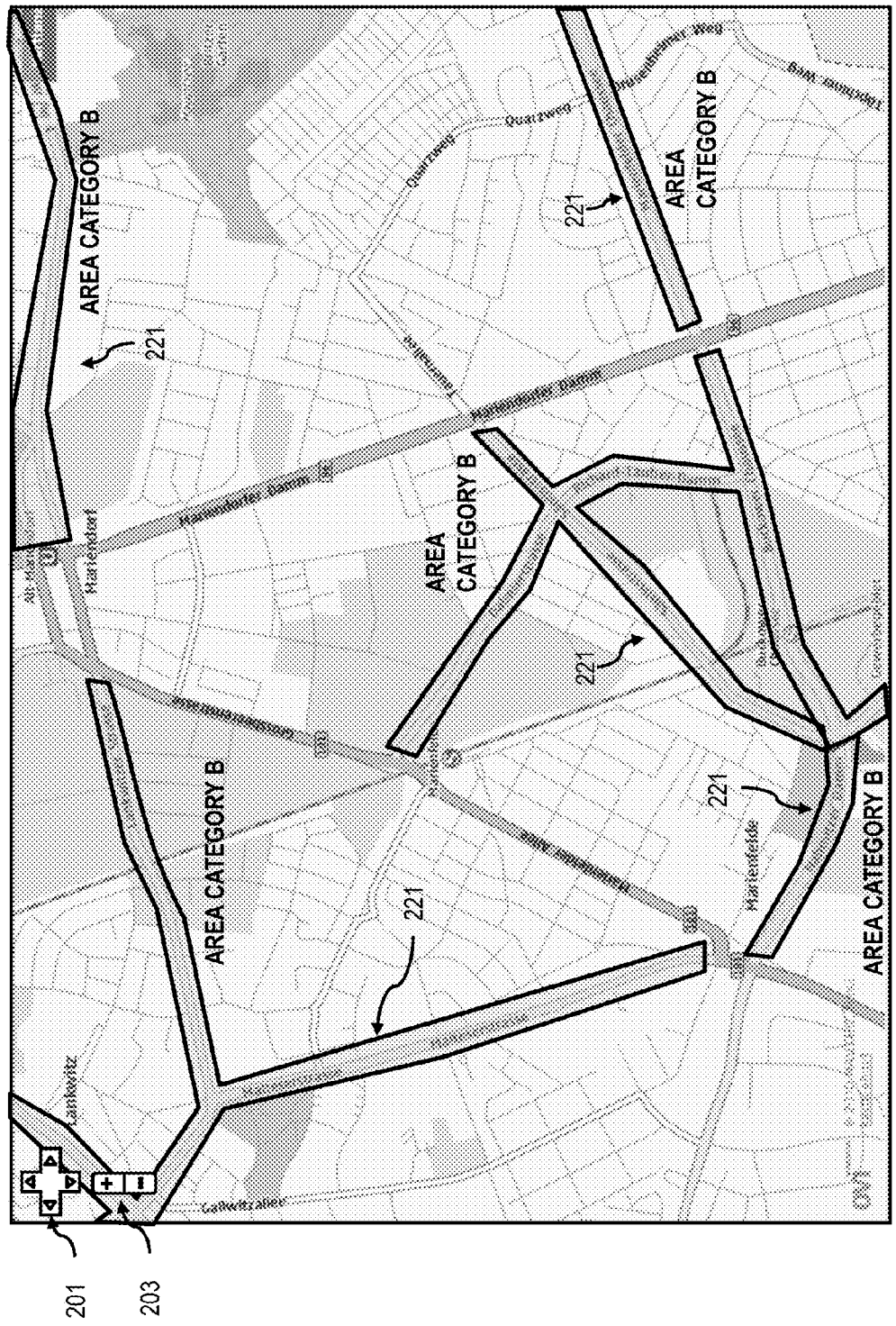
Figure 2D:
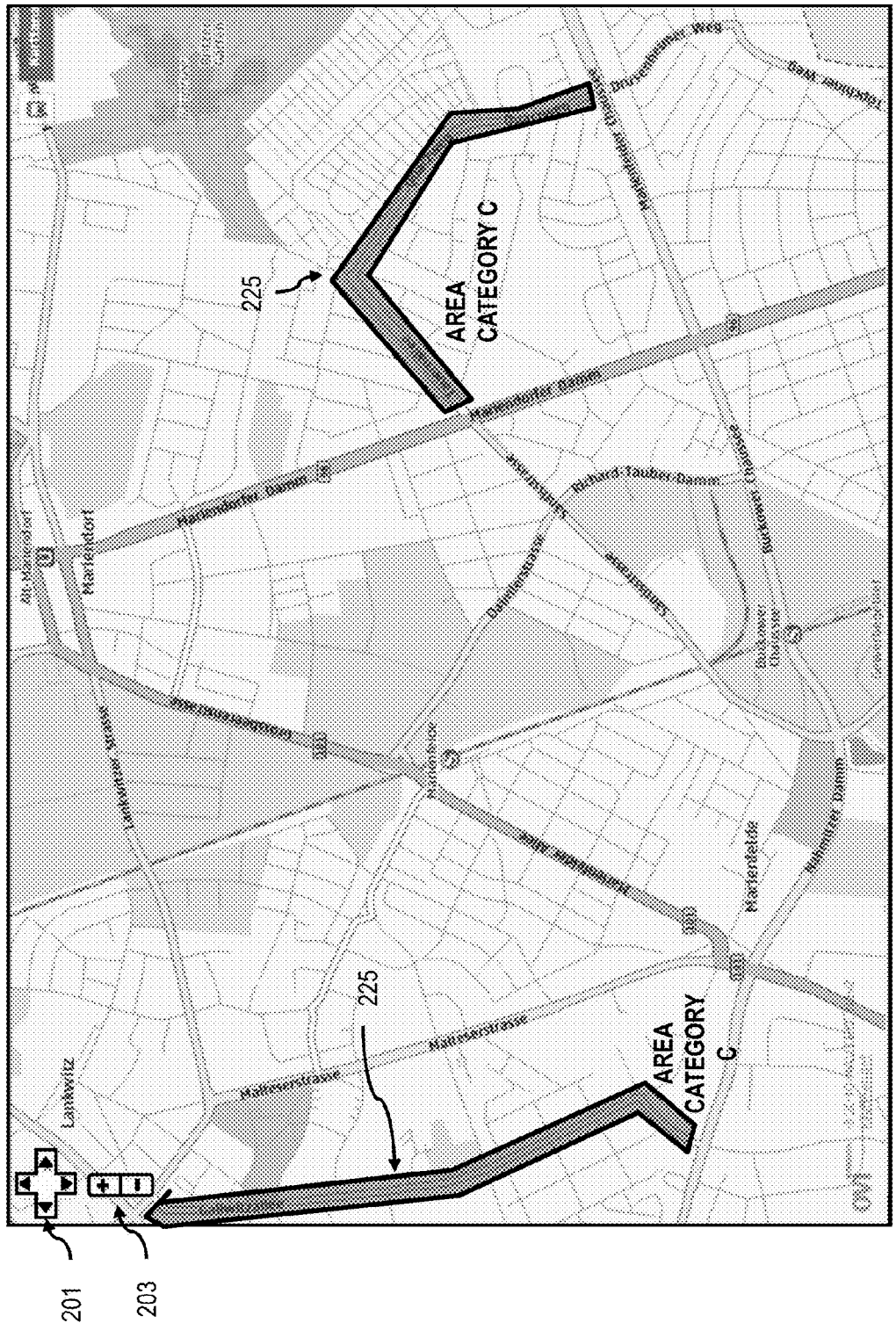

In FIGS. 2C and 2D, additional categories of route information, labeled in this example as Area Category B and C respectively are shown. By way of example, these categorizations represent a descending order of priority of predetermined route information category. Area Category B represents the next most important roads after those with respect to Area Category A of FIG. 2B. The route information is presented to display 219 as specific road and/or path segments 221 along with the mapping information. Under this scenario, the roadways and or pathways represented by segments 217 indicate routes that are normally used to access Area Category A roads—i.e., as presented by segments 217. Route information corresponding to Area Category C, as shown in FIG. 2D, represents a category of roads that are important passage ways for trucks and that have roadways along which several factories and industrial sites are located. The route information is presented to display 223 as one or more road and/or pathway segments 225. Under this scenario, a lower area weighting is assigned to the route information of Area Category B and C.

Figure 2E:
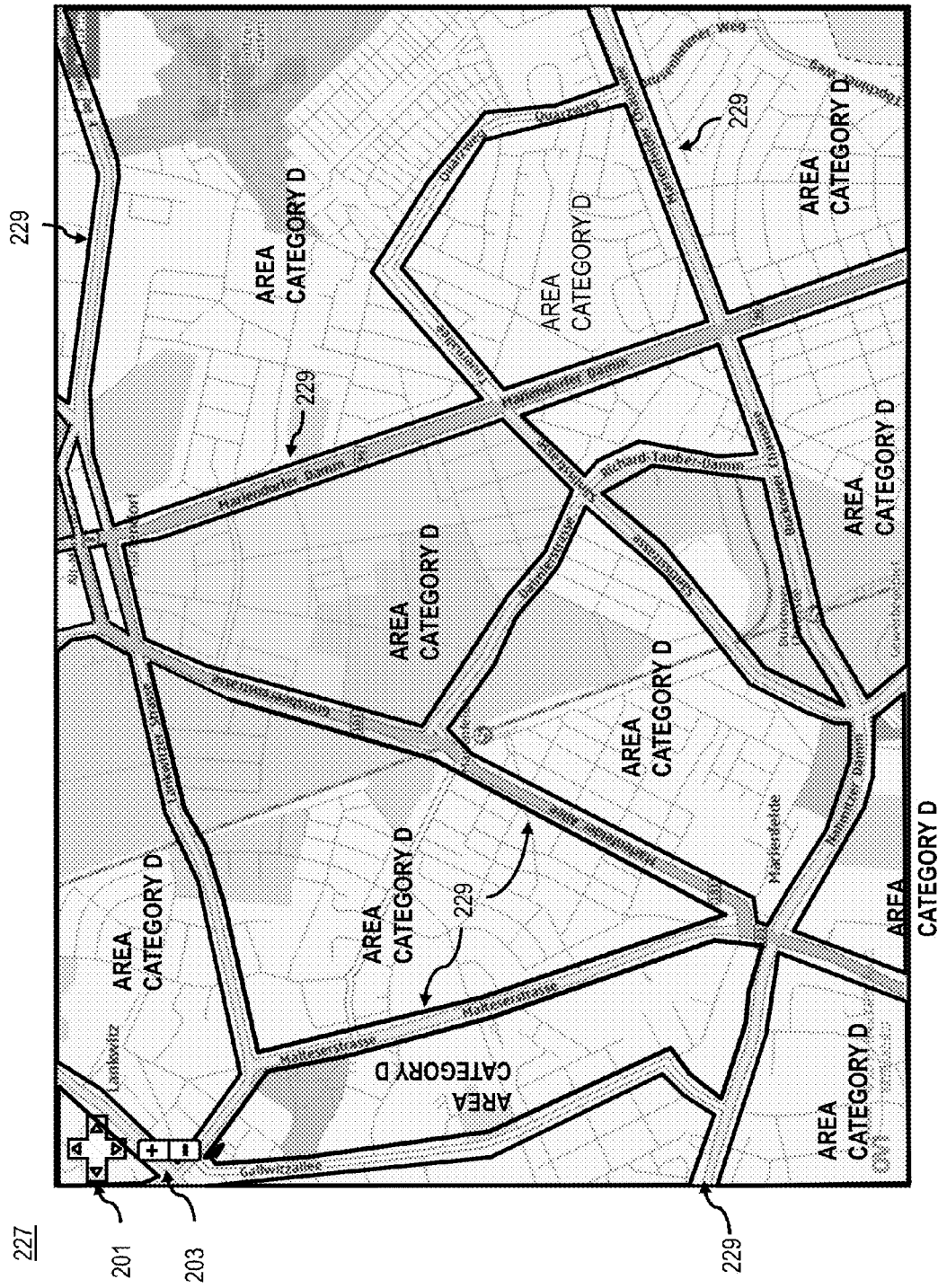

FIG. 2E is a display 227 for presenting mapping information and routing information corresponding to an Area Category D. By way of example, this categorization of route information represents mainly small and narrow roads and pathways having apartments and houses on both sides of the road. These residential roads are used to access higher priority roads, such as those of Area Category A. Under this scenario, the mapping information includes path and/or roadway segments 229.

FIG. 2F is a display 230 for presenting all road segments 217, 221, 229 as route information along with the same mapping information (map).

As noted before, the differing Area Categories are used to define the importance of changes in predefined navigation routes by users. By way of example, a user traveling along a segment 229 corresponding to a route on Area category D could make several exceptions in a short time given the numerous alternative routes available. It is less probable, therefore, that a user exits a predetermined navigation route corresponding to segment 217 of Area Category A. Also, by way of example, due to high traffic volume and capacity for segments 217 corresponding to Area Category A, the area weighting is set to 100. Under this scenario, if 100 users of UE 101a-101n navigating through the same geographic area make the same exception—i.e., pursue a different route category—their mapping information and routing information is updated and presented to the display accordingly.

In another exemplary use case, a user of a passenger vehicle operating within the geographic area represented in FIGS. 2A-2F is assigned a user weighting of 10, while another user is identified as by the navigation system 103 as a bus driver having user weighting information set to 20. Under this scenario, the reliability and/or level of trust of the bus driver is higher as this particular user is expected to follow a predefined bus route. As such, any deviation from the predefined route may indicate to a high level of reliability the presence of an obstacle, hindrance or other circumstance representing an exception. The following scenario presents a sequence of executions performed by the system 103, the navigation/mapping service 105, the navigation/mapping applications 107a-107n of respective UE 101a-101n, or combinations thereof in response to various exception conditions:

1. A portion of road comprising segment 217, as categorized to Area A, is blocked due to an accident.
2. The bus driver, having the higher user weighting, shift arrives at the road or approaches it as they engage their normal bus route. Pursuant to the accident, the bus driver makes an exception from the route. This deviation is reported by the identifier user, such as by way of the user's UE 101 via communication network 115.
3. Upon detecting the deviation and given the user weighting value, an area weighting for this particular area (e.g., position and close proximity) is set to a value of 80.
4. Subsequently, the user of the passenger vehicle, having the lower user weighting, arrives at the same road and makes the same exception as the bus driver. The area weighting value (e.g., for this position and close proximity) is set to 70 given the lower trust information associated with this user.
5. As time elapses, the navigation system 103 receives exception information 111 from more than 70 other users, all of which provide travel information for indicating they have deviated from predetermined route information to avoid the scene of accident. Based on reason information, type information and a combination thereof, the exception weighting of 70 is established by the system 103.
6. Once the threshold of exceptions is exceeded, the navigation system 103 prompts the navigation/mapping service 105 to update subsequent users of navigation/mapping applications 107a-107n of UE 101a-101n with the new route information. As a result, these users are directed along a path and/or road segment that takes them past the accident by way of an exceptional route (e.g., a route via Category B versus predetermined or preferred category A). It is noted that a map server administrator, capable of operating the navigation system 103, may be notified of the change.
7. After the scene of the accident is cleared over a period of time, where temporal information is recorded by the navigation system 103, mapping and/or route information can be reset to the predetermined route information. Alternatively, the mapping and/or route information can be updated after a number determined number of users follow the original route (e.g., Area Category A), thus representing once again exceptions to the current predetermined route (e.g., Area Category B).
8. The navigation system 103 assigns a lower area weighting of 50 to the original route. Thus after 50 users or a less number of identified users travel by way of the original route, i.e., a route corresponding to Area Category A, the map is returned to its original status.

It is noted in the above example that in addition to area and user weighting information, type and reason information is determined for enabling exception weighting. For instance, in the scenario above where an accident is the cause of deviation, such an occurrence can hinder or distract the traffic for a brief period time up until traffic enforcement clears the roadways. However, an exception causes by road construction along one or more road and/or path segments can last for several weeks or months, representing a more permanent exception type rather than temporary.

Figure 3:
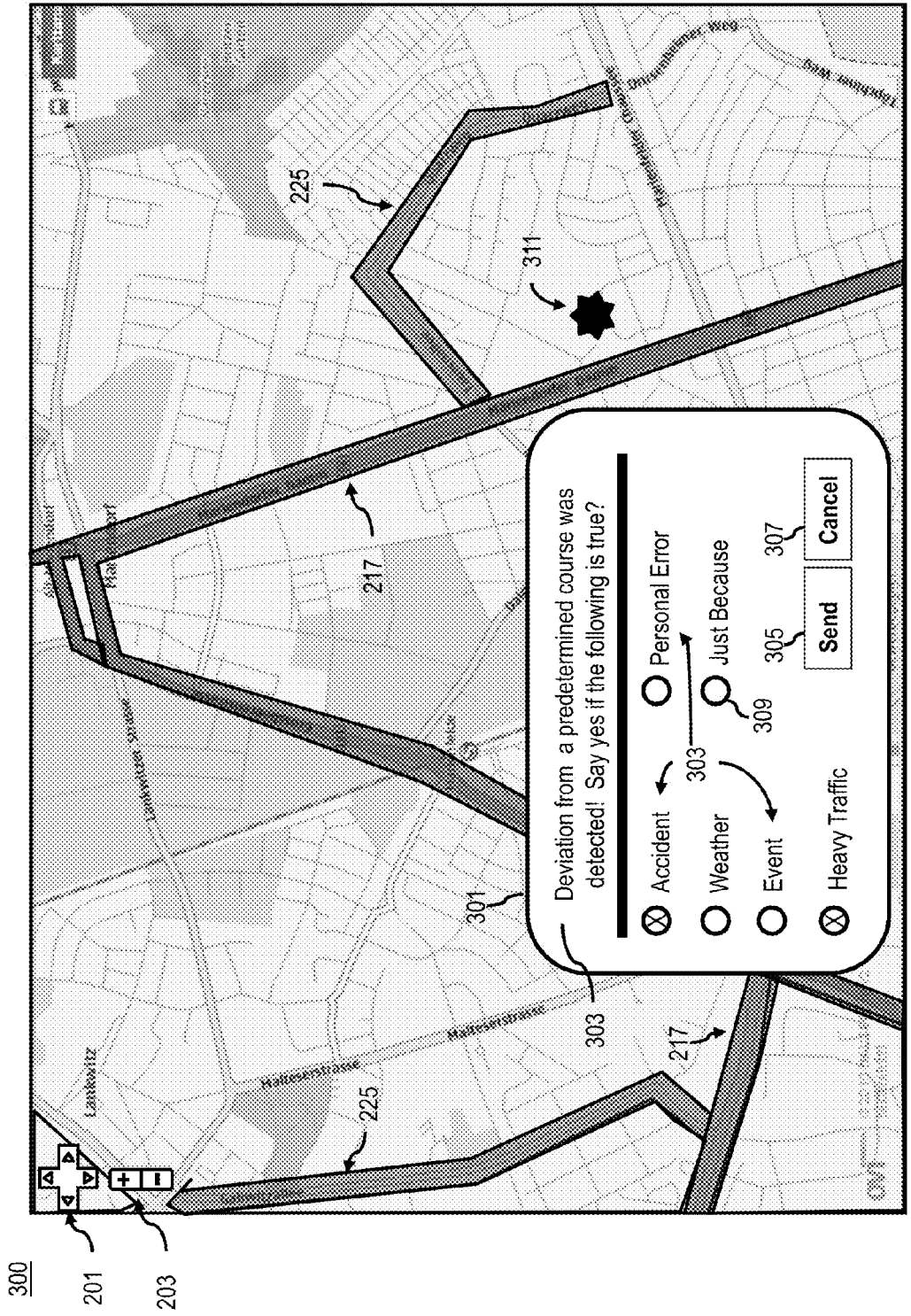
FIG. 3 presents an exemplary user interface for facilitating exception reporting, according to one embodiment.

Consequently, reason information and type information as used for performing exception weighting can only be provided after the reason is known. The reporting process may be facilitated by way of the navigation/mapping application 107a-107n of respective UE 101a-101n. FIG. 3 presents an exemplary user interface for facilitating exception reporting, according to one embodiment. By way of example, a user may deviate from predetermined route information corresponding to a segment of road 217 categorized as Area Category A for predetermined route information corresponding to a segment or road 225 for Area Category C due to an accident scene at point 311. In response to the deviation, a prompt 301 is presented to the user interface 300 for presenting a message 303 that the deviation was detected. In addition, the prompt 301 may also feature one or more exception conditions 303 for enabling a user to report exception information 111 (the cause of deviation). The user may select one or more conditions, i.e., via one or more radio buttons 309 or through voice activation (during driving). A "Send" action button 305 or "Cancel" action button 307 may then be selected for sending the exception information 111 or canceling submission of the exception information. In certain embodiments, the exception conditions 303 may be preselected by the navigation system for validation by the user. In other embodiments, it is also contemplated that the reporting process by respective users and/or UE 101a-101n is carried out via third party information, i.e., weather reports, traffic reports, GPS tracking, etc., without user prompting.

As noted earlier, the reason information and type information affect exception weighting. Resultantly, when a predetermined route is updated to a secondary route due to a traffic accident at a point 311 along the map, the secondary route can have significantly lower weighting than the original route. By way of example, consider a segment of road and/or pathway 217 corresponding to an area that is weighted as 100 (e.g., Area Category A=100). Due to accident at point 311 that is located along segment 217, multiple users of UE 101a-101n are determined to travel along a segment of road and/or pathway 225. This traffic pattern corresponds to a deviation by the navigation system 103. Under this scenario, the area weighting associated with the alternate road is set to 50 as it is may be a longer or slower road than the original route (based on normal navigation route calculation). Once reason information is reported as an accident, the exception weighting is set to be lower than a normal exception, i.e., 25. Thus after 25 users make an exception and use the original route, the navigation route for all users is set back to original and the value of 100 is restored. In the case where the reason for exception is not recognized or reported, 50 users would need to perform an exception (deviation) to the predetermined route.

Figure 4B:
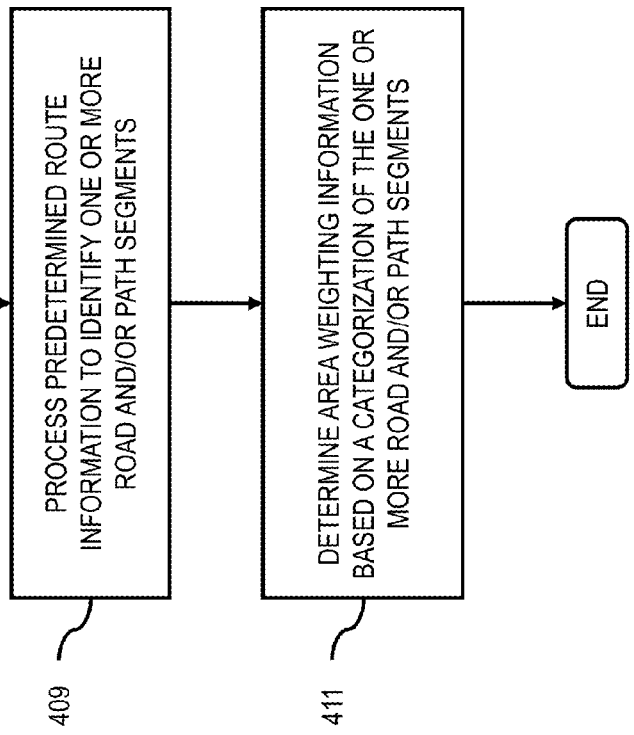
FIGS. 4A-4F are flowcharts of a process for providing mapping information and route information based on exception information received from various users travelling within a common area, according to various embodiments.
Figure 4A:
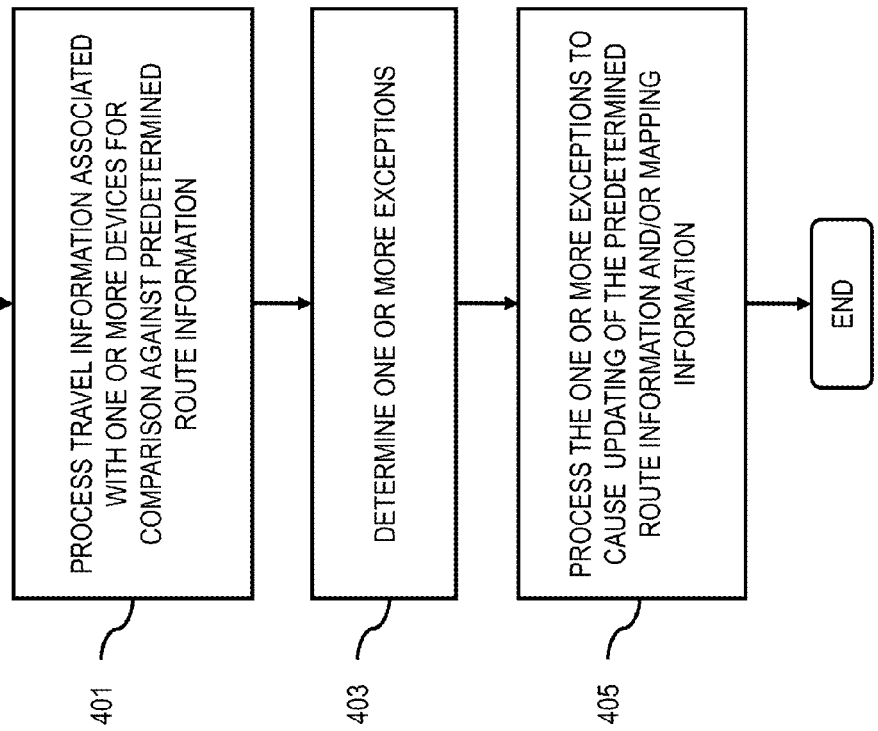
Figure 4D:
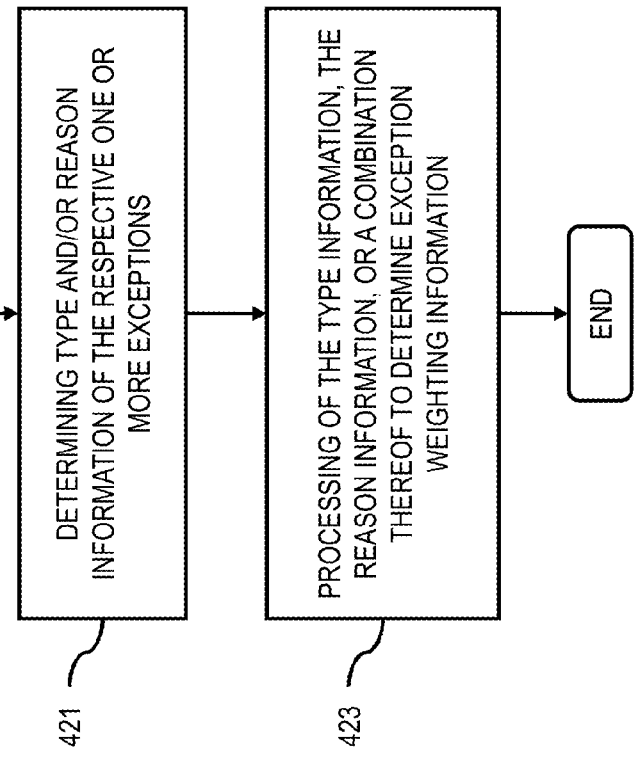
Figure 4C:
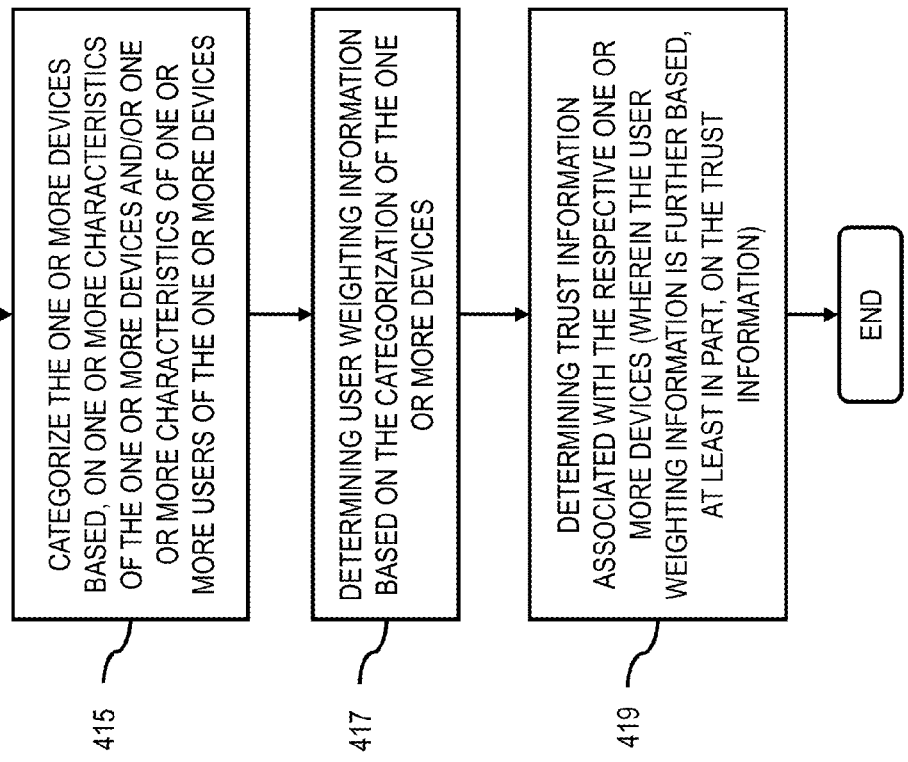
Figure 6:
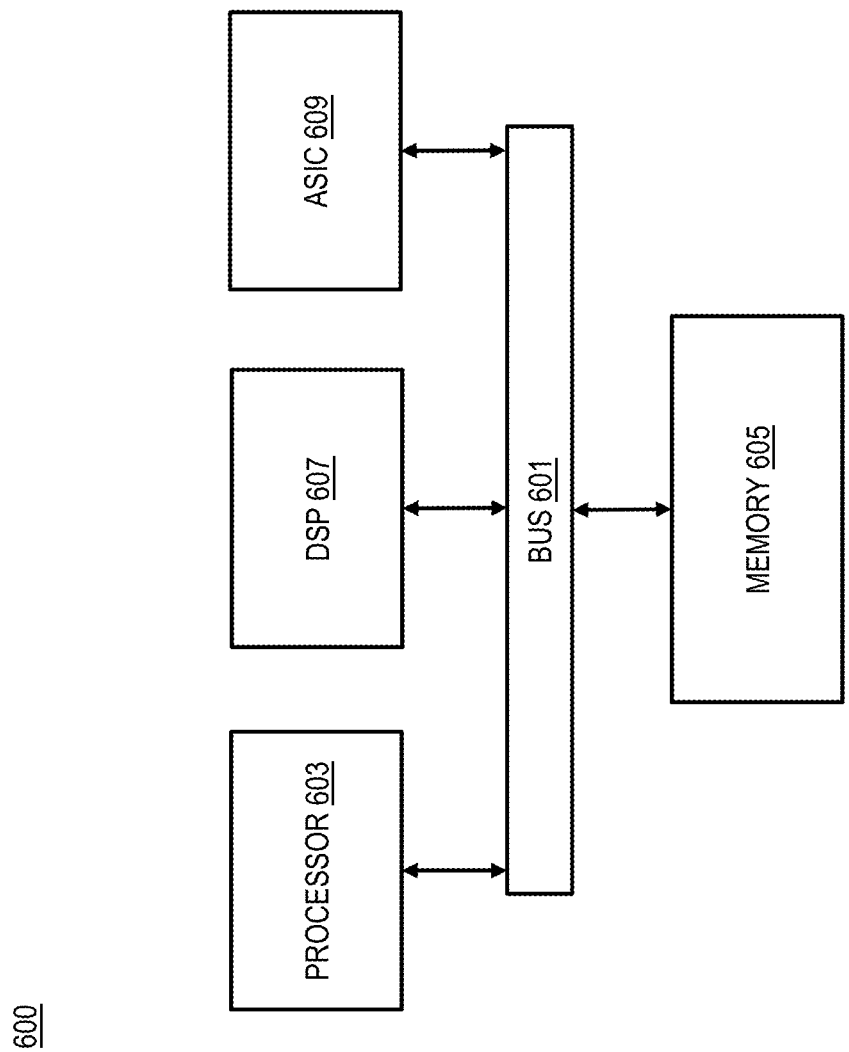
FIG. 6 is a diagram of a chip set that can be used to implement an embodiment of the invention.

FIGS. 4A-4C are flowcharts of a process for providing mapping information and route information based on exception information received from various users travelling within a common area, according to various embodiments. In one embodiment, the navigation system 103 performs processes 400, 408, 414, 420, 426 and 434 and is implemented in, for instance, a chip set including a processor and a memory as shown in FIG. 6. For the purpose of illustration, the processes are described with respect to FIG. 1. It is noted that the steps of the process may be performed in any suitable order, as well as combined or separated in any suitable manner.

In step 401 of process 400, the navigation system 103 processes travel information associated with one or more devices (e.g., UE 101a-101n) for comparison against predetermined route information. As mentioned previously, the predetermined route information may include data based on a best case scenario basis, i.e., devoid of factors such as traffic volume, real-time travel information, exceptions as performed by various drivers, etc. In another step 403, the system 103 determines one or more exceptions to the predetermined route information based on the comparison. The one or more exceptions, received from various user devices, represent one or more deviations by one or more devices from at least one route indicated in the predetermined route information. Per step 405, the navigation system 103 processes the one or more exceptions (e.g., as exception information 111) to cause updating of the predetermined route information and/or mapping information. As mentioned, this includes updating the presentment of mapping information and/or route information to a display of UE 101a-101n by way of navigation/mapping applications 107a-107n.

In step 409 or process 408 of FIG. 4B, the navigation system processes the predetermined route information to identify one or more road and/or path segments. In another step 411, the system 103 determines area weighting information based on a categorization of the one or more road and/or path segments. As noted previously, the categorization of the one or more road segments and/or path segments is based on traffic volume, traffic capacity, types of nearby points of interest, types of uses, etc. The categorization enables the navigation system 103 to account for various conditions, factors or circumstances that impact a user's ability or inclination to reach a destination by way of a predetermined route. In another step 411, the system 103 determines area weighting information based on a categorization of the one or more road and/or path segments. By way of this approach, the navigation system 103 may update of the predetermined route information and mapping information—i.e., the presentment of road and/or path segments to the display—based on the area weighting information.

In step 415 of process 414 of FIG. 4C, the navigation system 103 categorizes the one or more devices based on one or more characteristics of the one or more devices and/or one or more characteristics of one or more users of the one or more devices. In another step 417, user weighting information, for indicating a level of trust or reliability of exception information 111 provided by a given user, is based on the categorization of the one or more devices. It is noted that the updating of the predetermined route information, mapping information, or a combination thereof is based on user weighting information. Per step 419, user weighting information is determined based on the determining of trust information associated with the respective one or more devices. Hence, the navigation system 103 also accounts for characteristics of the participating reporting users providing exception information 111 for facilitating the updating or route and mapping information.

In step 421 of process 420 of FIG. 4D, the navigation system 103 determines type information of the respective one or more exceptions. As noted previously, the reason information and type information may provide details regarding the reason for an exception/deviation being executed or a type of user transport (e.g., vehicle type) associated with the exception. The navigation system 103 maintains this data in addition to or as part of the exception information. In particular, per step 423, the navigation system 103 processes the type information and/or reason information to determine exception weighting information—i.e., a level or rank of validity or usefulness of a given exception with respect to a predetermined route. Updating of the predetermined route information, the mapping information, or a combination thereof is based on the exception weighting information. Moreover, the updating is based on area weighting information.

Figure 4F:
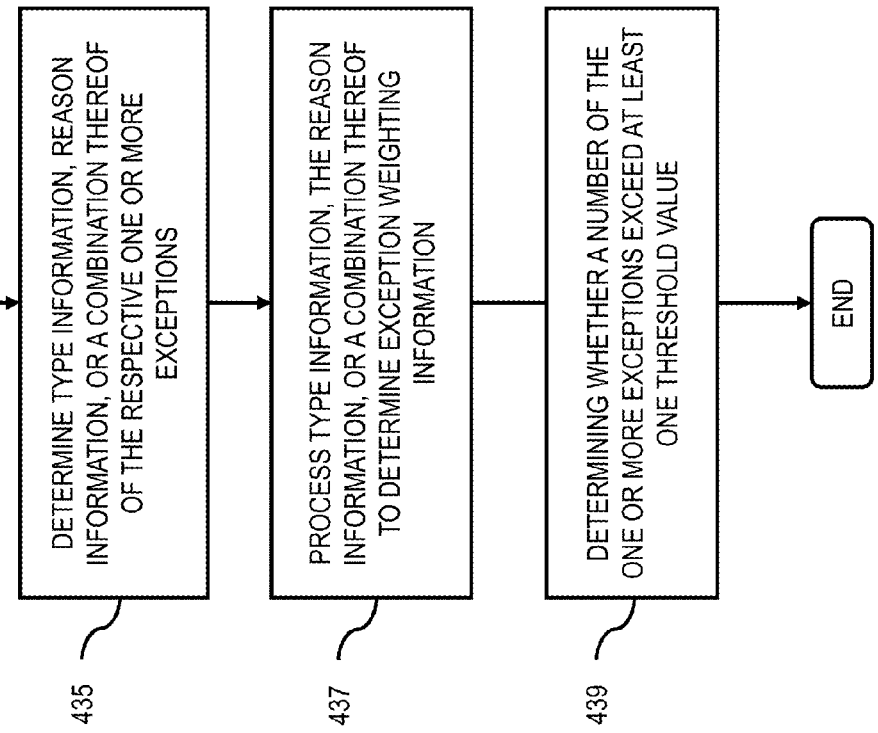
Figure 4E:
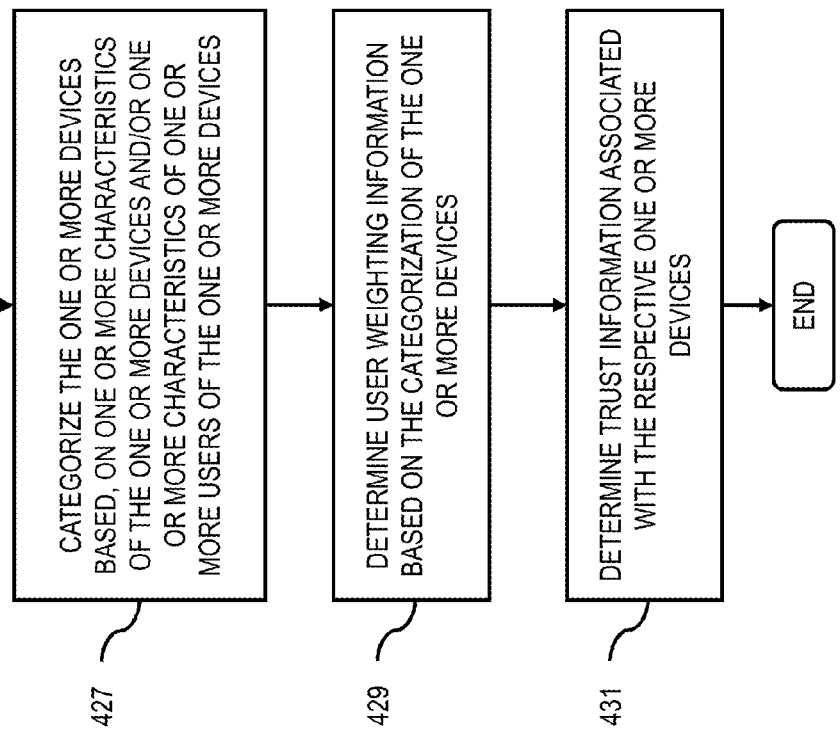

Per step 427 of process 426 of FIG. 4E, the navigation system 103 categorizes the one or more reporting UEs based on characteristics of the device and/or users of said devices. In step 428, the system further determines user weighting information based on the categorization of the one or more devices. In another step 432, trust information is determined in association with the one or more devices. Of note, the user weighting information is based on the trust information.

In steps 435 and 437 of process 434 of FIG. 4F, type and/or reason information is determined for one or more exceptions as reported and subsequently processes to determine exception weighting information. Per step 439, the navigation system 103 determines whether a number of the one or more exceptions exceed at least one threshold value. As such, updating of the predetermined route information and/or mapping information is based on the determination with respect to the at least one threshold value. By way of this approach, the navigation system 103 may adapt to deviations for a period of time and necessity by accounting for temporal information. In addition, the system 103 may enable mapping and/or route information to be based again on original predetermined route information in response to the absence of the conditions that led to a deviation.

The processes described herein for providing mapping information and route information based on exception information received from various users travelling within a common area may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
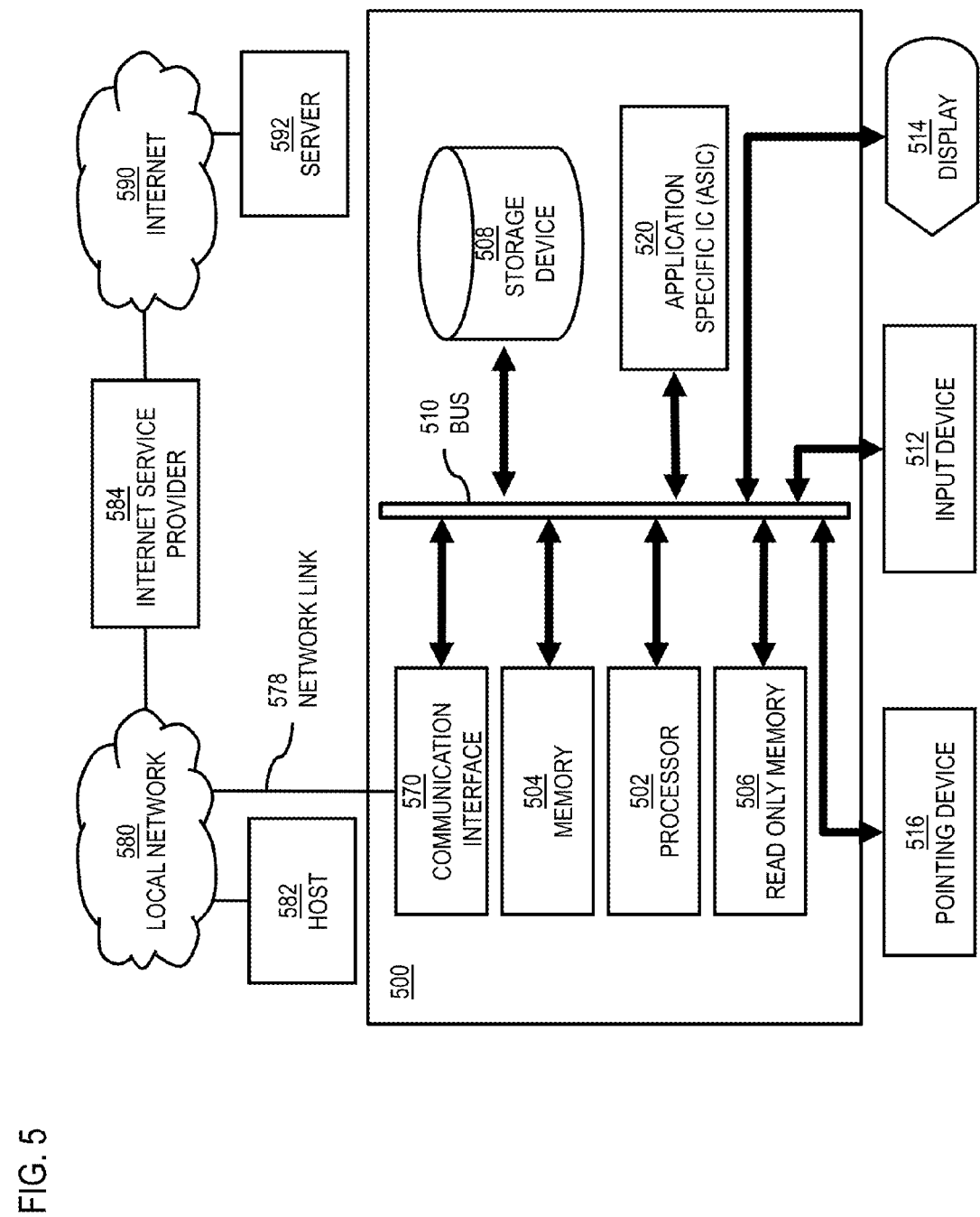
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to provide mapping information and route information based on exception information received from various users travelling within a common area as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of to providing mapping information and route information based on exception information received from various users travelling within a common area.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to provide mapping information and route information based on exception information received from various users travelling within a common area. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for providing mapping information and route information based on exception information received from various users travelling within a common area. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing mapping information and route information based on exception information received from various users travelling within a common area, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 115 for providing mapping information and route information based on exception information received from various users travelling within a common area to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to provide mapping information and route information based on exception information received from various users travelling within a common area as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of providing mapping information and route information based on exception information received from various users travelling within a common area.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide mapping information and route information based on exception information received from various users travelling within a common area. The memory 605 also stores the data associated with or generated by the execution of the inventive steps.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of providing mapping information and route information based on exception information received from various users travelling within a common area. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor (s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of providing mapping information and route information based on exception information received from various users travelling within a common area. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to provide mapping information and route information based on exception information received from various users travelling within a common area. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of or processing (1) data, (2) information or (3) at least one signal, the (1) data, (2) information or (3) at least one signal based, at least in part, on the following:
    a processing of travel information associated with a plural number of devices for comparison against predetermined original route information;
    a detection of at least one exception by a plurality of the devices based, at least in part, on the comparison, wherein the at least one exception represents a deviation by the plurality of the devices from a route indicated in the predetermined original route information; and
    a processing of the at least one exception to cause, at least in part, updating of at least a portion of mapping information at a network based server in response to a routing request from at least one device, other than the plurality of devices used for the detection of the at least one exception.

2. A method of claim 1, wherein the (1) data, (2) information or (3) at least one signal are further based, at least in part, on the following:
    a processing of the predetermined original route information to identify one or more road segments, one or more path segments, or a combination thereof; and
    area weighting information based, at least in part, on a categorization of the one or more road segments, the one or more path segments, or a combination thereof,
    wherein the updating of the at least a portion of the mapping information is based, as least in part, on the area weighting information.

3. A method of claim 2, wherein the categorization of the one or more road segments, the one or more path segments, or a combination thereof is based, at least in part, on traffic volume, traffic capacity, types of nearby points of interest, types of uses, or a combination thereof.

4. A method of claim 1, wherein the (1) data, (2) information or (3) at least one signal are further based, at least in part, on the following:
    at least one determination to categorize the plurality of the devices based, at least in part, on one or more characteristics of the plurality the devices, one or more characteristics of one or more users of the plurality of the devices, or a combination thereof; and
    user weighting information based, at least in part, on the categorization of the plurality of the devices,
    wherein the updating of the at least a portion of the mapping information is based, as least in part, on the user weighting information.

5. A method of claim 4, wherein the (1) data, (2) information or (3) at least one signal are further based, at least in part, on the following:
    trust information associated with each of the plurality of the devices,
    wherein the user weighting information is further based, at least in part, on the trust information.

6. A method of claim 1, wherein the (1) data, (2) information or (3) at least one signal are further based, at least in part, on the following:
- type information, reason information, or a combination thereof of the at least one exception; and
- a processing of the type information, the reason information, or a combination thereof to determine exception weighting information,
- wherein the updating of the at least a portion of the mapping information is based, at least in part, on the exception weighting information.

7. A method of claim 1, wherein the (1) data, (2) information or (3) at least one signal are further based, at least in part, on the following:
- at least one determination of whether a number of the at least one exception that is detected exceeds at least one threshold value,
- wherein the updating of the at least a portion of the mapping information is based, as least in part, on determination with respect to the at least one threshold value.

8. A method of claim 7, wherein the at least one threshold value is based, at least in part, on traffic volume information associated with one or more road segments, one or more path segments, or a combination thereof indicated in the travel information, the predetermined original route information, or a combination thereof.

9. A method of claim 1, wherein the (1) data, (2) information or (3) at least one signal are further based, at least in part, on the following:
- temporal information associated with the at least one exception,
- wherein the updating of the at least a portion of the mapping information is based, as least in part, on the temporal information.

10. A method of claim 1, wherein the (1) data, (2) information or (3) at least one signal are further based, at least in part, on the following:
- a processing of the predetermined original route information to identify one or more road segments, one or more path segments, or a combination thereof; and
- area weighting information based, at least in part, on a number of exceptions detected at each of the identified one or more road segments, the one or more path segments, or a combination thereof,
- wherein the updating of the at least a portion of the mapping information is based, as least in part, on the area weighting information.

11. An apparatus comprising:
at least one processor; and
at least one memory including computer program code for one or more programs,
the at least one memory and the computer program code configured to, with the at least one processor, cause the apparatus to perform at least the following,
- process or facilitate a processing of travel information associated with a plural number of devices for comparison against predetermined original route information;
- determine at least one exception based, at least in part, on the comparison, wherein the at least one exception represents a deviation by a plurality of the devices from a route indicated in the predetermined original route information; and
- process or facilitate a processing of the at least one exception to cause, at least in part, updating of at least a portion of mapping information at a network based server in response to a routing request from at least one device, other than the plurality of devices used for the detection of the at least one exception.

12. An apparatus of claim 11, wherein the apparatus is further caused to:
- process or facilitate a processing of the predetermined original route information to identify one or more road segments, one or more path segments, or a combination thereof; and
- determine area weighting information based, at least in part, on a categorization of the one or more road segments, the one or more path segments, or a combination thereof,
- wherein the updating of the at least a portion of the mapping information is based, as least in part, on the area weighting information.

13. An apparatus of claim 12, wherein the categorization of the one or more road segments, the one or more path segments, or a combination thereof is based, at least in part, on traffic volume, traffic capacity, types of nearby points of interest, types of uses, or a combination thereof.

14. An apparatus of claim 11, wherein the apparatus is further caused to:
- determine to categorize the plurality of the devices based, at least in part, on one or more characteristics of the plurality of the devices, one or more characteristics of one or more users of the plurality of the devices, or a combination thereof; and
- determine user weighting information based, at least in part, on the categorization of the plurality of the devices,
- wherein the updating of the at least a portion of the mapping information is based, as least in part, on the user weighting information.

15. An apparatus of claim 14, wherein the apparatus is further caused to:
- determine trust information associated with each of the plurality of the devices,
- wherein the user weighting information is further based, at least in part, on the trust information.

16. An apparatus of claim 11, wherein the apparatus is further caused to:
- determine type information, reason information, or a combination thereof of the at least one exception; and
- process or facilitate a processing of the type information, the reason information, or a combination thereof to determine exception weighting information,
- wherein the updating of the at least a portion of the mapping information is based, at least in part, on the exception weighting information.

17. An apparatus of claim 11, wherein the apparatus is further caused to:
- determine whether a number of the at least one exception that is detected exceeds at least one threshold value,
- wherein the updating of the at least a portion of the mapping information is based, as least in part, on determination with respect to the at least one threshold value.

18. An apparatus of claim 17, wherein the at least one threshold value is based, at least in part, on traffic volume information associated with one or more road segments, one or more path segments, or a combination thereof indicated in the travel information, the predetermined original route information, or a combination thereof.

19. An apparatus of claim 11, wherein the apparatus is further caused to:
- determine temporal information associated with the at least one exception,
- wherein the updating of the mapping information is based, as least in part, on the temporal information, temporal information associated with the one or more exceptions, wherein the updating of the least a portion of the mapping information is based, as least in part, on the temporal information.

20. An apparatus of claim 11, wherein the apparatus is further caused to:

process or facilitate a processing of the predetermined original route information to identify one or more road segments, one or more path segments, or a combination thereof; and determine area weighting information based, at least in part, on a number of exceptions detected at each of the identified one or more road segments, the one or more path segments, or a combination thereof, wherein the updating of the at least a portion of the mapping information is based, as least in part, on the area weighting information.

\* \* \* \* \*